Oct. 9, 1962   H. C. DOUGLAS   3,057,517
APPARATUS AND METHOD FOR DISPENSING LIQUIDS
Filed Feb. 19, 1960   3 Sheets-Sheet 1
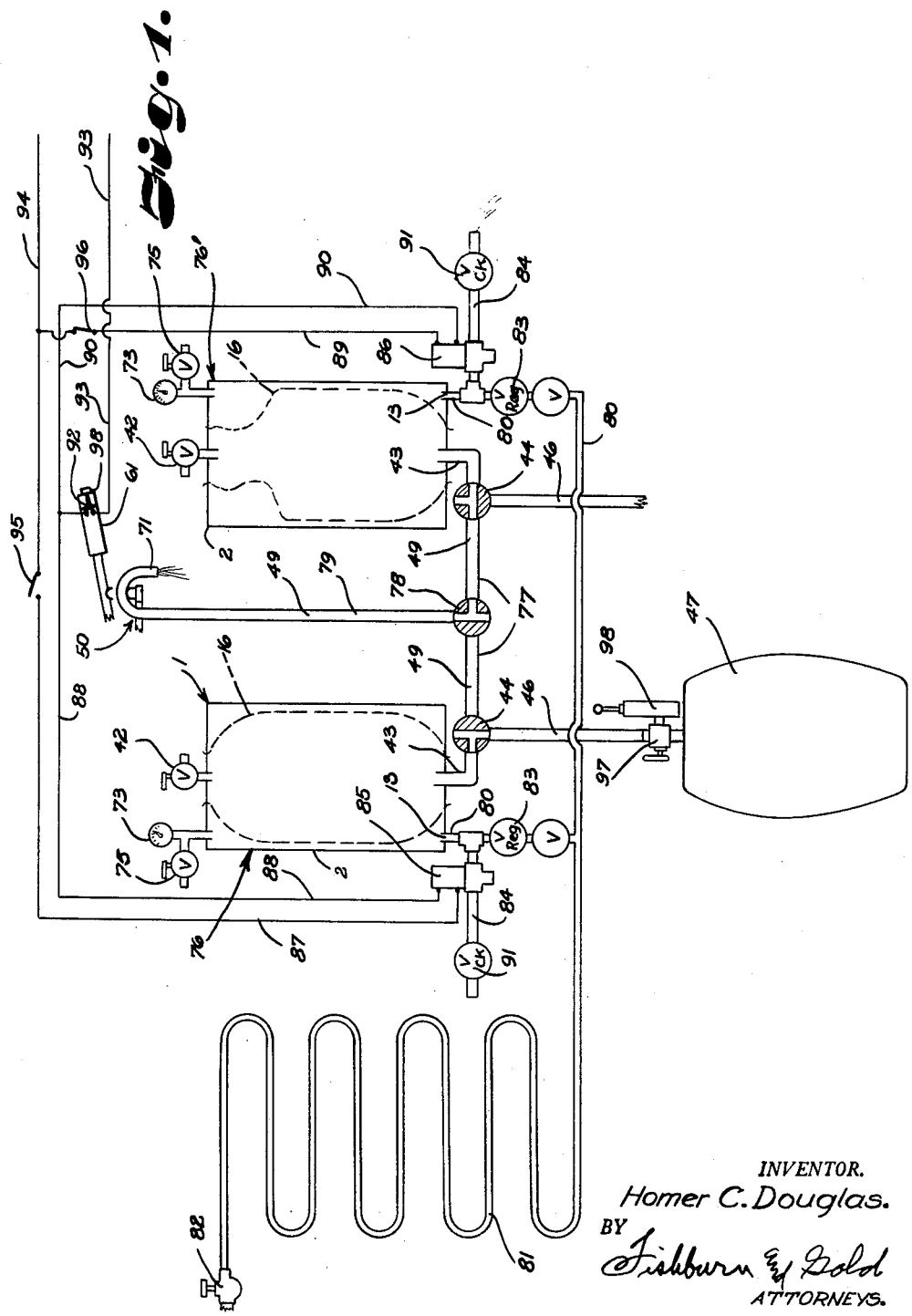
INVENTOR.
Homer C. Douglas.
BY
Fishburn & Gold
ATTORNEYS.

Oct. 9, 1962     H. C. DOUGLAS     3,057,517
APPARATUS AND METHOD FOR DISPENSING LIQUIDS
Filed Feb. 19, 1960     3 Sheets-Sheet 2
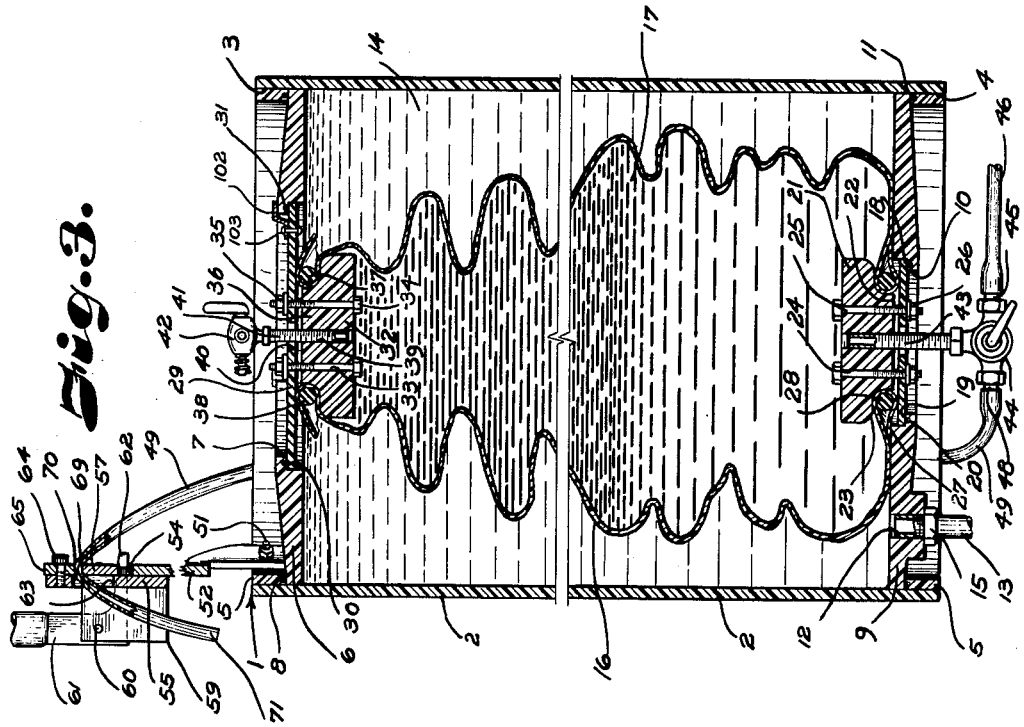
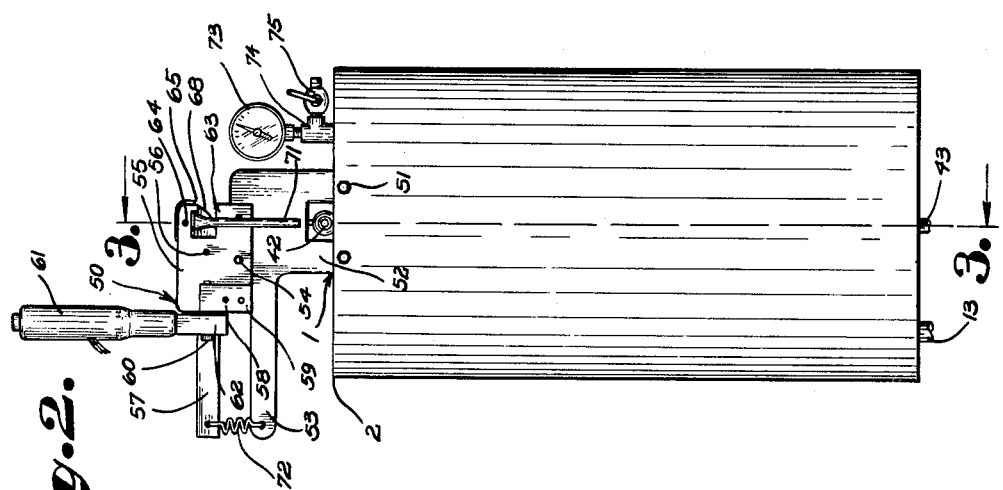
INVENTOR.
Homer C. Douglas.
BY
Fishburn & Gold
ATTORNEYS.

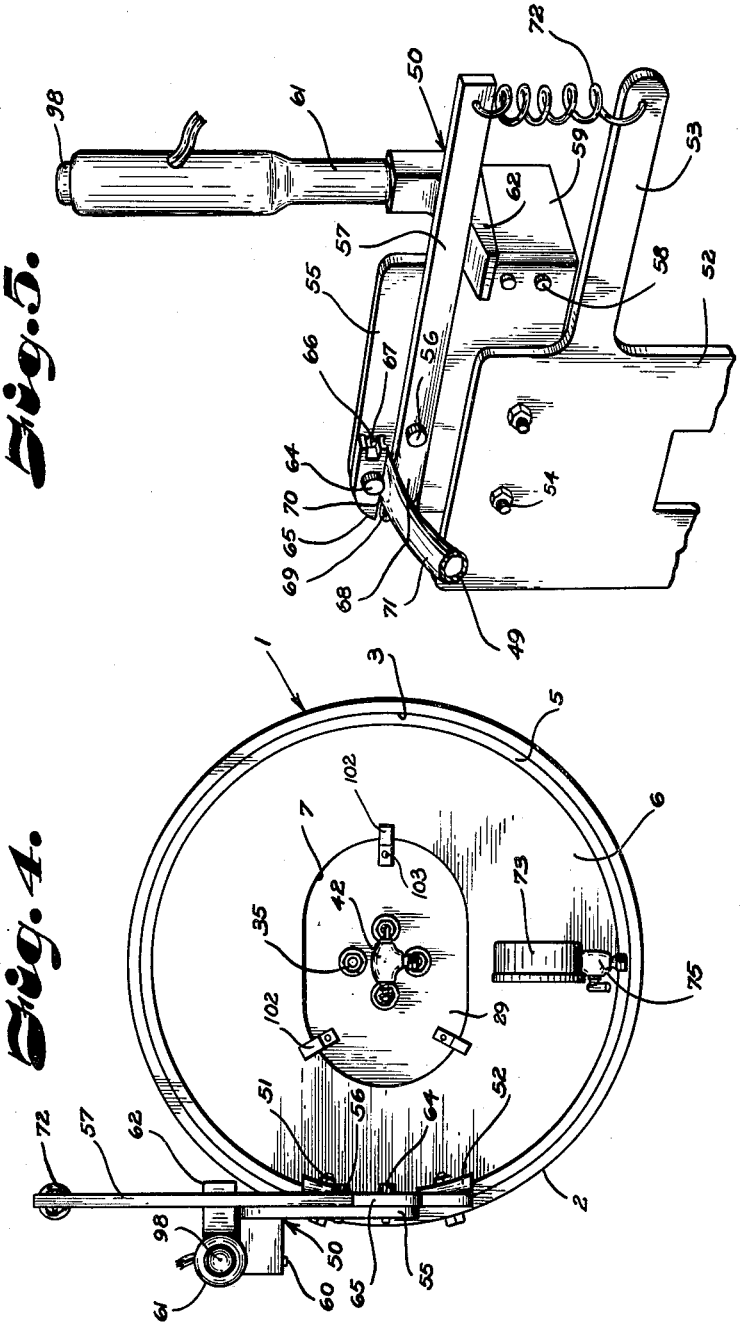

United States Patent Office 3,057,517
Patented Oct. 9, 1962

3,057,517
APPARATUS AND METHOD FOR DISPENSING
LIQUIDS
Homer C. Douglas, Kansas City, Kans., assignor of one-half to G. M. Warehime, Kansas City, Mo.
Filed Feb. 19, 1960, Ser. No. 9,877
6 Claims. (Cl. 222—1)

This invention relates to an apparatus and method for dispensing liquid and more particularly to an improved apparatus and method for dispensing beer from a container.

In order to keep carbonated beverages such as beer palatable while stored in barrels, it is necessary to keep high pressure thereon to prevent loss of the gas contained in solution. In dispensing the beer, heretofore it has been necessary to use a restricted throat valve which causes a large pressure drop in order to achieve a reasonably slow flow rate from the high pressure in the barrel to atmospheric pressure. The flow through the restricted throat valve produces a violent agitation of the beer which causes an excessive release of the dissolved gases and, it is believed, also alters the flavoring components resulting in a flat tasting beverage.

The principal object of the present invention is to provide an apparatus and method by which the high pressure maintained on the beer in storage may be rapidly reduced prior to dispensing so a portion of the beer may be subsequently dispensed at low pressure, that is, across a small pressure drop, without substantial agitation thereto, and the pressure in the barrel may then be quickly increased to retain the undispensed portion or balance of the beer in the most palatable condition.

Other objects of this invention are: to provide an improved apparatus and method for refrigerating beer; to provide such an apparatus and method for handling beer in a sanitary manner; to provide such an apparatus and method for eliminating the use of gas under high pressure to effect the dispensing of beer from barrels; and to provide a device of this character of simple construction and efficient in operation.

In accomplishing these and other objects of the invention I have provided improved details of structure the preferred forms of which are shown in the accompanying drawings wherein FIG. 1 is a diagrammatic view of two bag holding containers joined together and hooked up with a supply of carbonated liquid such as beer for insertion in the bags and a cooling line for liquid surrounding the bags in the containers, and electric controls for dispensing the beer.

FIG. 2 is a side view of a container.

FIG. 3 is a vertical cross sectional view taken on a line 3—3, FIG. 2.

FIG. 4 is a top plan view of a container.

FIG. 5 is an enlarged perspective view particularly illustrating the brackets and valves and handle arrangements for closing a tube communicating with a bag.

Referring more in detail to the drawings:

1 designates a liquid dispensing apparatus embodying the features of my invention comprising a container 2 having an open top 3 and an open bottom 4. The container is adapted to be mounted in a cooling compartment (not shown) and set in a convenient place for dispensing carbonated liquids such as beer as later shown.

The walls of the container 2 may be metal, plastic or other suitable material and cylindrical flat rings 5 are provided in each end thereof and suitably secured to the inner walls of the container. A top 6 is provided for the container which may be of metal, plastic or other suitable material and has a central opening 7 therein. The upper side of the top or cover 6 is slightly tapered towards the walls of the container and mounted between the upper edge of the cover and the lower edge of the cylindrical ring 5 is an O-ring 8 to seal the cover against the ring 4. A bottom 9 is provided for the container and also has an opening 10 therein and an O-ring 11 engaging between the top of the lower side of the bottom and the cylindrical ring 5 to also seal the bottom in the container. The O-rings provide a tight seal to make the container airtight.

Provided in the bottom 9 and near one side wall of the container is an opening 12 for a line 13 for admitting water or other liquid to the container as indicated at 14. The line 13 has a suitable connection sealing the line therein as indicated at 15, FIG. 3. A bag 16 is of flexible plastic material such as polyethylene or any similar material and is adapted for containing beer indicated at 17. The bag 16 has its lower end secured to a plate or the like 18 adapted to engage in the opening 10 in the bottom of the container. The opening 10 is counterbored forming a shoulder 19 against which the plate 18 rests and an O-ring 20 is provided for sealing the plate therein. A connecting member 21 is provided of plastic or other suitable material and has a neck portion 22 providing an annular groove 23 therearound. The connecting member 21 has openings 24 for receiving bolts or the like 25 for securing the connecting member to the plate 18 for holding the same together by the usual nuts 26. The lower portion of the bag has a central opening and the edges turned upon themselves as indicated at 27 and adapted to engage the lower portion of the bag surrounding said opening and engaged therearound is a rubber O-ring 28 for sealing the lower ends of the bag into the annular groove 23 of the connecting member 21 and said O-ring is squeezed between plate 18 and member 21 and also tightly engages the neck 22 to effectively close the lower end of the bag.

A plate or the like 29 is provided for the opening 7 in the cover 6 and the opening is counterbored forming a shoulder 30. An O-ring 31 is provided in the shoulder 30 for engaging the top of the plate 29 to effectively seal the plate in the opening when pressure is applied on the liquid 14 in the container.

A connecting member 32 is provided for the plate 29 to fasten the upper end of the bag 16 thereto. The connecting member has openings 33 for bolts 34 which extends through openings in the plate 29 and is held thereto by nuts 35. The connecting member 32 has a neck 36 providing an annular groove 37 therearound and the upper end of the bag has an opening with its free end wrapped around a rubber O-ring 38 which engages in the groove 37 and holds the bag to the connecting member and also effectively seals it against the plate 29.

The connector member 32 and plate 29 have aligned openings 39 and 40 therein through which is extended a hollow stem or sleeve 41 for a petcock 42 for releasing air from the bag 16 as later described.

The lower connecting member and plate have similar openings through which a tubular stem or sleeve 43 extends and has a three-way valve 44 thereon as illustrated in FIG. 3, and has a connection 45 for a line 46 leading to a source of supply of liquid such as beer as indicated at 47 (FIG. 1). The valve also includes a connection 48 for a tube or line 49 for dispensing the liquid such as beer from the bag 16 which is a flexible hose or the like and leads to a cutoff device 50 now to be described.

Mounted on the top of the container 2 and on the inside of the circular ring 4 by bolts or the like 51 is a bracket 52 particularly illustrated in FIG. 5. The bracket 52 has a laterally extending arm 53 formed integrally with the upper portion of the bracket 52. Secured to the bracket 52 by bolts or the like 54 is a plate 55 and pivotally mounted on the plate by a bolt or the like 56 is a lever 57 which extends parallel with the arm 53. Secured to the back of the plate 55 by bolts or the like 58 and extending rearwardly from the arm 53 is a lug 59 to which is pivotally mounted by a pin 60 a handle 61 having a laterally extending foot 62 engaging under the lever 57. The plate member 55 at the side opposite the lever 61 is provided with a slot or cut-out portion 63.

Pivotally mounted to one side of the plate 55 adjacent the slot 63 by a pin 64 is a stop member 65. The end 68 of the lever 57 has its upper edge rounded or convexed as indicated at 69, FIG. 3, and the lower edge of the stop member 65 is concaved as indicated at 70. The end 71 of the flexible tube 49 is adapted to be engaged between said concave and convex surfaces 70 and 69 and extend through the slot 63 to provide a spout for dispensing the beer.

The stop member or the like 65 has one end notched as indicated at 66 and the movement of the stop is limited by pin 67 secured in the plate 55 and engaging in the notched portion 66. A coil spring or the like 72 has one end engaged to the outer end of the arm 53 and the other end engaged with the outer end of the lever 57 so that an upward pressure will always be exerted on the end 68 of the lever to squeeze the end of the tubular member 71 between the surfaces 69 and 70 of said stop member 65 and the end 68 of the lever 57 to shut off the liquid from the bag 16.

The top 6 of the container has an opening (not shown) in which a pressure gauge 73 is secured. The pressure gauge is secured to a fitting 74 which receives a petcock 75. The pressure gage 73 is for determining the pressure on the water in the container for a purpose later described.

FIG. 1 illustrates diagrammatically two of the liquid dispensing apparatuses or units as indicated at 76 and 76'. It will be noted that the two units 76 and 76' are connected by a line 77 through a three-way valve 78. Connected to the valve 78 is a flexible line which leads to the cutoff mechanism as just above described. Line 79 corresponds to line 49 (FIG. 3). Lines 80 are connected to the lower ends of the units or containers 76 and 76' which corresponds to the line 13 (FIG. 3) and which leads to a source of water supply or coolant material through cooling coil 81 having a valve 82 for shutoff. The water supply lines 80 are provided with regulating valves 83. Connected to lines 80 are lines 84 and located in said lines are solenoid valves 85 and 86. Conductors 87 and 88 lead from a source of electrical current (not shown) to valve 85 and conductors 89 and 90 lead to valve 86. Check valves 91 are located in lines 84 outwardly of the solenoid valves and permit flow therethrough only at a pressure above approximately three pounds per square inch. The water regulating valves 83 are set so that normally not over one gallon of water per minute is discharged through the lines 80. Conductors 88 and 90 lead to one side of a switch 92 in the handle 61 and a conductor 93 connects to the other side of said switch 92 from a source of supply (not shown). Conductors 87 and 89 lead to the line 94 connected to said source. Closing of switch 92 will energize the solenoid valves 85 and 86 and open the same to lower the water pressure in the container 2 in a manner and for a purpose later described. Switches 95 and 96 are provided in conductors 87 and 89 to permit operation of the solenoid valves 85 and 86 separately.

It will be obvious that the unit may be operated singly or a plurality can be set up in tandem as illustrated in FIG. 1. The barrel 47 has a shutoff valve 97 to shut off the liquid from the barrel to the container, and pump means 98 for pressurizing the beer in the barrel.

In operation of a dispenser constructed and assembled as described with the bag 16 in place and the plate 29 held in place in the opening in the cover 6 by lugs 102 pivoted to the plate by pins 103 and valves 44 closed, the air is first completely expelled from the bag 16. This is accomplished (considering the unit 76, FIG. 1) by opening the solenoid valve 85, opening the petcocks 42 and 75, and opening the valve 82 in the water line 80 which will allow the water or coolant material to flow through the regulating valve 83 into the container 2 and around the 16. Filling of the container 2 with water forces the air out of the container 2 through petcock 75 and also causes the bag 16 to collapse by expelling the air therefrom through the tubular stem 41 and the open petcock 42. When the water has filled the container 2, petcocks 42 and 75 are closed and the pressure in the container 2 rises to approximately three pounds per square inch as water exits past the valve 91. The bag 16 is now ready to be filled with beer or other desired liquid as now to be described.

Attach the barrel 47 to line 46, leaving valve 85 open to maintain the pressure at three pounds in the container 2. Open valve 97 and maintain pressure in the barrel 47 above three pounds an amount suitable for transferring the beer therein to the bag 16 against the three pounds pressure and continue operation until the barrel 47 is empty and close valve 97. During the bag filling operation water is displaced from the container 2 through check valve 91. The bag 16 should be larger than the barrel 47. The regulator valve 83 allows water to pass continuously to the container 2 at a rate not normally exceeding one gallon per minute as described above. The container carries three pounds pressure when the solenoid valve 85 is open and approximately fifteen pounds, or line pressure when the valve 85 is closed. When it is desired to dispense beer from the unit after the bag 16 is filled, the valve 44 is turned to close line 46 to allow the beer to flow through line 49 and valve 78 turned to open with line 49 to the spout 71. The switch 92 is closed by means of the pushbutton 98 to operate the solenoid valve 85. Line pressure of approximately fifteen pounds on the water in the container 2 will be maintained until the solenoid valve 85 operates to open and allow the water to flow through lines 13 and 84 and check valve 91 to a place of disposal. Immediately upon operation of the solenoid valve to open same, the pressure on the water around the bag drops to approximately three pounds as controlled by the check valve 91 thus relieving the high storage pressure of 15 pounds on the beer or other material in the bag 16.

While the solenoid 85 is open the check valve 91 will maintain the pressure on the bag at approximately three pounds, the desired pressure to permit opening of the tube 49 without violent agitation as it flows therethrough. The solenoid valve 85 may then be closed (leaving the tube 49 open) and the beer will be dispensed at a rate of one gallon per minute. When the tube 49 is closed, the pressure in the container 2 will then rise to line pressure or 15 pounds for storage.

Movement of the handle 61 rearwardly will cause the foot 62 to raise the outer end of the lever 57 to release the "pinch" or squeezing of the end of the tube 49 to allow the liquid to move from the bag 16 through line 43, valve 44, line 77, valve 78, line 79 to the spout 71. Releasing of the handle will immediately cut off flow of the liquid due to the tension of the spring 72 on the lever 57 to again pinch the tube 49. The switch 92 controls the solenoid valves 85 or 86 individually as desired by manipulating the switches 95 and 96.

When the beer in bag 16 of unit 76 has been fully dissipated or removed by the above operation, the valve 78 is closed and the filling operation of unit 76' may be performed by operation of the valve 44 of unit 76', to open the line 46 to said unit. Operation of filling of unit 76' is then the same as above described for unit 76.

It will be understood in placing the bag in the container the bottom is first secured to the connecting member 21 and the connecting member fastened to the plate 18 in the bottom by fastening of the bolts 25. The upper connecting member 32 after being secured to the plate 29 is placed in the opening 7 of the cover member 8 and the fastening lugs 102 pivotally mounted on the plate 29 by the pins 103 turned to engage the cover 6. There may be two or more of these lugs on the cover as illustrated in FIG. 4 to hold the upper end of the bag suspended in the container when the liquid is being dispensed therefrom.

I do not wish to be limited to the apparatus described herein for a source of supply of the beer as other means may be utilized without departing from the spirit of my invention.

It will be obvious from the foregoing that I have provided improved structure and method of dispensing beer or like liquid from a container wherein such contents are stored at a high pressure but dispensed at a very low pressure and without the necessity of using $CO_2$ or some such gas to pressurize the beer to remove it from the container as is the common practice, and also without the use of large pressure drop restrictions which cause violent agitation of the beer.

What I claim and desire to secure by Letters Patent is:

1. Apparatus for storing beer in a closed container at a first pressure and dispensing same from said container at a pressure lower than said first pressure comprising; a flexible bag disposed within the container and adapted to hold the beer, said container having a liquid therein between said container and said flexible bag, a line communicating with said container and connected to a source of liquid normally under a first pressure, said liquid normally exerting the first pressure on said bag, a regulating valve in said line adapted to restrict the rate of flow therethrough, a pipe communicating with said container, said pipe having a remote controlled valve therein, a check valve on said pipe along with said remote controlled valve, said check valve being adapted to permit said liquid to flow therethrough from said container at a pressure substantially lower than the first pressure upon opening said remote controlled valve to temporarily reduce the pressure on said liquid, a normally closed tube communicating with said bag from without said container, and means for opening and closing said said tube during periods of reduced pressure in said container, whereby said beer is stored at the first pressure and the first pressure may be temporarily substantially reduced prior to the opening of said tube whereby said beer may be dispensed from said tube without violent agitation thereto caused by a large pressure drop from the first pressure to atmospheric pressure.

2. Apparatus for storing beer in a closed container at a first pressure and dispensing same from said container at a pressure lower than said first pressure comprising; a flexible bag disposed within the container and adapted to hold the beer, a line communicating with said container, said line being connected to a source of liquid normally under a first pressure, a regulating valve in said line for limiting the maximum flow rate of said liquid into said container at the maximum flow rate beer is to be dispensed, the first pressure being normally exerted by said liquid on said bag, a pipe communicating with said container, said pipe having a solenoid controlled valve therein for selectively permitting flow therethrough, a check valve on said pipe downstream from said solenoid controlled valve, said check valve adapted to permit said liquid to flow therethrough from said container at a pressure substantially lower than the first pressure to temporarily reduce the pressure on said liquid, means for energizing said solenoid controlled valve, a tube communicating with said bag from without said container, and means for opening and closing said tube during periods of reduced pressure in said container, whereby said beer is stored at the first pressure and the first pressure may be temporarily substantially reduced prior to the opening of said tube whereby said beer may be dispensed from said tube without violent agitation thereto caused by a large pressure drop from the first pressure to atmospheric pressure.

3. The apparatus of claim 2 wherein said container has an open end, closure means for said open end, said closure means including a plate, a connecting member secured to said plate and inside said container, said connecting member having a neck portion of lesser diameter than the body thereof, said neck portion being located between said body portion and said plate, said bag having an opening in the end thereof, means securing said bag around said neck portion at said bag opening, aligned openings in said plate and connecting member, said aligned openings containing a tubular member communicating with said bag; said tube being a flexible dispensing tube having one end connected to said tubular member, said means for opening and closing said tube holding the other end thereof and being adapted for selectively squeezing same to effect the opening and closing thereof.

4. The apparatus of claim 3 wherein in said container has an open bottom and an open top and one of said closure means being secured respectively to said open bottom and top, and said bag has an opening at each end thereof and said bag is secured by said securing means around respective neck portions of said closure means respectively at said bag openings, and the tubular member in said closure means at the bottom of the container is connected to said tube, and the tubular member in said closure means at the top of the container is connected to means to selectively allow air to escape from said bag.

5. The apparatus of claim 4 wherein a valve member is connected between said tubular member in said closure means at the bottom of said container and said dispensing tube, and said means for opening and closing said tube is carried by a bracket secured to the top of the container.

6. The method of dispensing a measure of beer at low pressure from a flexible bag contained within a closed container and having a fluid in said container in contact with the outside of said bag and normally under a high pressure for preserving said beer, said bag communicating with a normally closed tube extending out of said container, said method comprising; reducing said high pressure on said fluid to a low pressure, subsequently opening said normally closed tube, urging said beer to flow out of said tube while maintaining said fluid in contact with said bag at said low pressure, closing said normally closed tube, and increasing the pressure on said bag to said high pressure.

References Cited in the file of this patent

UNITED STATES PATENTS

| 703,824 | Quinn | July 1, 1902 |
| 2,013,633 | Kellogg | Sept. 3, 1935 |
| 2,527,927 | Grow | Oct. 31, 1950 |
| 2,564,163 | Leperre | Aug. 14, 1951 |
| 2,576,747 | Bryant | Nov. 27, 1951 |
| 2,778,534 | Ramsey | Jan. 22, 1957 |
| 2,963,202 | Dickinson et al. | Dec. 6, 1960 |

FOREIGN PATENTS

| 2,068 | Great Britain | Sept. 10, 1859 |